United States Patent [19]

Cordell

[11] Patent Number: 4,949,379
[45] Date of Patent: Aug. 14, 1990

[54] PROCESS FOR ENCRYPTED INFORMATION TRANSMISSION

[76] Inventor: Steve Cordell, 3317 Cardiff Ave., Los Angeles, Calif. 90034

[21] Appl. No.: 348,294

[22] Filed: May 5, 1989

[51] Int. Cl.$^5$ ............................................. H04L 9/30
[52] U.S. Cl. ....................................... 380/9; 380/23; 380/25; 380/50; 380/30; 381/42; 381/43; 367/198; 455/79; 379/95
[58] Field of Search .................. 380/9, 23, 25, 49, 50, 380/30; 367/198; 455/79, 151; 381/42, 43; 379/95

[56] References Cited

U.S. PATENT DOCUMENTS

| | | | |
|---|---|---|---|
| 3,283,074 | 11/1966 | Csicsatka | 367/198 X |
| 4,400,584 | 8/1983 | Vilmur | 455/79 |
| 4,426,733 | 1/1984 | Brenig | 455/79 |

*Primary Examiner*—Stephen C. Buczinski
*Assistant Examiner*—Bernarr Earl Gregory
*Attorney, Agent, or Firm*—Dickstein, Shapiro & Morin

[57] ABSTRACT

A secure voice transmission system is disclosed in which enemy interception problems are overcome by analyzing the speech characteristics of a password from a known operator. Some of the voice characteristics remain in the central computer, while others are stored in the message entry device. If a captured operator is forced to enter the password, the characteristics under such extreme stress will not match those stored within the devices and the capture of the operator will be assumed. Before the start of the mission, the portable device receives a preliminary public key; the first remote message of the mission can thus be sent in the clear, with no chance of the enemy using the information or the device, should the operator be prematurely captured. After the operator has been recognized as being a noncaptive, his device requests permission from the command center to create a crypto keyset; the device keeps the private key and transmits the public key to the command center. In this way, the command center has an opportunity to send the final public key to the device, thus establishing two-way crypto communication.

11 Claims, 3 Drawing Sheets

PROCESS FOR ENCRYPTED INFORMATION TRANSMISSION

BACKGROUND OF THE INVENTION

1. Field of the Invention

The present invention relates to a process and method for the transmission of encrypted information between a normally mobile or handheld reporting device and a central controller, whereby the information encryption as well as the transmission is dependent on the voice characteristics of a spoken password.

2. Description of the Prior Art

On the current battlefield, information between a central control post and one or more reporting devices is transmitted via radio or cable in digitally encoded form (with or without encryption) or with voice information. The voice, whether digitally encoded or as analog signals, is immediatly recognized as a known comrade. The non-encrypted digital data is accepted without automatically checking the authorization or identification-authentication. Encrypted messages are likewise accepted without authorization or authentication checks. Encryption keys are sent via physical means; i.e. they are collected or delivered in the form of a card or as printed information. The information is multifariously transmitted per radio transmission. Thereby, the receiving operator cannot recognize the operator of the transmitter.

Basically, the following problems exist:

1. Reporting devices, for example those of the forward observation units, could be captured. Listening into the transmissions and the sending of false messages follow after such capture. The loss of the transmission post and the device is either not discovered or is recognized too late.

2. If the message between the command post and a forward observer is transmitted encrypted, then there exists the danger that the enemy will get control of the key, either through trickery or force. The key must be changed often. According to the usual process, a safe, independent channel is necessary to transfer the key. In any case, it is impossible to establish whether the device including its operator have been captured or whether the device alone has been captured. The voice messages can be deceptively sent by threatening the operator; digital messages could be accepted for some time without doubt, especially in the case of encryption, whereby the messages from the transmitting post are considered especially safe. From time to time, the key must be changed; the more frequently the better.

Partial aspects of the above described problems are solved in the field via voice transmission, digitalyzing the messages and encrypting of the messages, and the problems mitigated by means of procedures and devices. Procedures for encrypted information transmission are known; e.g. DE 1 062 750 (German Patent) describes such a procedure. The disadvantage of this procedure is that the recognition of the operator is not possible. Further, a speech recognition procedure is known from the European Patent 0 027 596 A1, by which the voice of the operator is recognized by comparison of his voice characteristics stored in a memory. The disadvantage of said described procedure is due to the fact that an unauthorized person can change the voice characteristics stored in the device and can therefore send false messages and can receive encrypted messages; this would be either recognized too late or not at all.

SUMMARY AND OBJECTS OF THE INVENTION

It is therefore an object of the present invention to provide a process and method by which the security against misuse of encrypted information transmission is increased. Thereby it shall be considered that listening in on transmissions and the transmission of false messages due to the capture of a reporting device will with certainty be eliminated. Also the misuse of a secret key, due either to the capture of the key while it is in transport or capture of a reporting device with a key already installed, will be prevented.

Further, it is an object of the invention to limit the misuse of a captured reporting device or a secret key to a minimum.

Finally, by the capture of the operator of the reporting device and by forced operation according to regulations, such use will be detected with certainty as misuse.

The foregoing objects are achieved by the present invention, which provides that for the initial preparation, the voice of a known operator by relaxed speaking of a password is analyzed with reference to the voice characteristics, and said characteristics being stored as recognition signals within the central controller as well as within the reporting device, and that to open the information transmission channel the operator first speaks the password into the reporting device, and a part of these voice characteristics are compared in a coarse analysis with the said stored recognition signals, that by agreement, the transmission channel to the central controller is opened using a preliminary message-encryption key, that the central controller processes the voice characteristics further by the execution of a fine analysis in order to increase the recognition certainty, and that by significant agreement of the voice characteristics with the stored recognition signals, the operator will be recognized as authorized as well as being in freedom, and the information transmission channel is released for transmission. The advantage of this process is that the operation of the reporting device is only possible by recognition of the stored voice characteristics. In case the operator is captured, and under threat forced to enter the password according to the regulations, the voice characteristics, due to stress-induced distortions, would not coincide with the stored voice characteristics, and the reporting device, either alone or in conjunction with the central controller, due to the distribution of the voice characteristics in both devices, would recognize the changed situation and would take the necessary countermeasures. In case a reporting device is captured, opening of the device, e.g. to change the program or the stored voice characteristics, would not influence the stored voice characteristics in the central controller.

Further, the present invention achieves the foregoing objects in that after the release of the information transmission channel by the reporting device, from voice characteristics of the operator as well as algorithms and other means and methods a message-encryption key is created, and then a one-way channel to the central controller is opened. The advantage of this process is that message-encryption keys are not distributed via physical means, whereby they may be captured, but via electronic means which must pass strict recognition tests. The message-encryption key set retains its validity only as long as the central controller acknowledges the recognition password; without acknowledgement, the key in the reporting device loses its validity and the subsequent capture of the reporting device does not result in a security risk.

Further, the present invention achieves the foregoing objects in that a part of the password recognition signal is stored in the reporting device and another part of the password recognition signal of the same password is stored in the central controller. The advantage of this process is to decrease the transmission time to the central controller, because the voice characteristics stored in the reporting device are used to pre-process the password; the resulting compressed data retains sufficient information content but is less redundant and contains less non-significant data components, whose recognition quality by the central controller is increased by the addition of various stored voice characteristics in non-periodic places in the information transmission flow, and whose contents, via pre-programmable rules and algorithms, make possible the creation of a message-encryption key set.

Further, the present invention achieves the foregoing objects by providing that, after the learning process and storage of the voice characteristics, a preliminary message encryption key is transferred to the reporting device from the central controller. The advantage of this process is that the operator of the reporting device can send his first message transmission from a remote post without risk that a non-authorized listener can extract information therefrom; otherwise, the first information transmission, although being digitized, would be in so-called cleartext, which anyone with the appropriate device could listen into.

Finally, the present invention achieves the foregoing objects by providing that, after the creation of a message-encryption key set, the reporting device retains a secret key and transfers a public key to the central controller. The advantage of this process is that the reporting device with the secret key is the only device which can receive and interpret messages encrypted with said public key.

DETAILED DESCRIPTION OF THE PREFERRED EMBODIMENT

Figure 1:
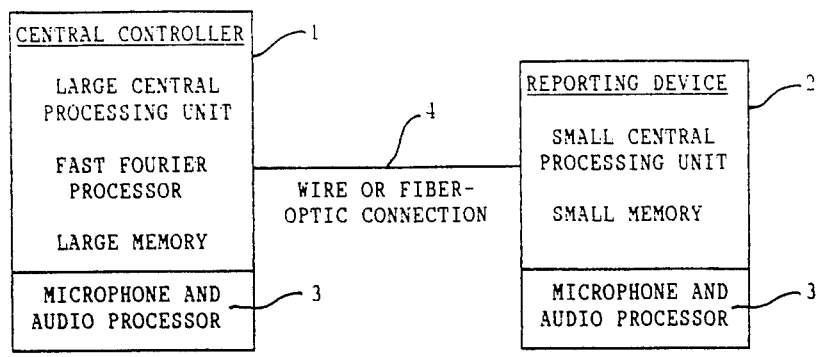
FIG. 1 is a block diagram illustrating the initialization of the recognition data within the central controller and the reporting device prior to the beginning of a mission.

The voice characteristics of a particular operator of a reporting device are used to prevent an unauthorized person from sending false messages or from listening in on transmissions from the central controler with a captured device. Captured devices are rendered fully valueless to unauthorized users after a definite, pre-programmable time. In the literature, one can find numerous references to public key systems which allow information to be transmitted via encoding by a public key which can only be deciphered by the holder of additional information, i.e. a secret key. A disadvantage of this well known procedure is that the receiver has no technical means to determine who the sender of the information is. To eliminate this disadvantage, the following process is applied.

The voice characteristics of a known, particular operator, spoken as a password while relaxed in an input learn-process, are used to create a common secret key between the transmitting partners. No other operator can create the key, because the stored voice characteristics are available for comparison. If the operator were forced by threats to enter the password, the stored voice characteristics would be compared and the attempt defeated. The voice characteristics, spoken under extreme stress, would deviate from the expected characteristics. In case of doubt, as always, the personnel of the central controller would be allerted, or the controller itself would recognize the problem.

If a replacement is to take over the reporting device in the field, this is only possible when his voice characteristics have been stored in the central controller and the controller recognizes them as currently valid. If now the initial operator is recognized as authorized, the replacement may enter the password, and when he is recognized as an authorized member of the team, he would be henceforth acknowledged as the sole, current operator. Before beginning the mission, the initial operator of the reporting device allows his voice characteristics to be analyzed and stored in the reporting device as well as at least partly in the central controller. The password is spoken a number of times so that the voice characteristics by relaxed speaking may be refined as recognition signals. In this manner the reporting device and the central controller learn the nuances of the voice characteristics, which the later analyses of the recognition attempts will refine even more precisely. A preliminary public key will be transferred to the reporting device, so that the operator can send his first message without the message being understood by an unauthorized listener. This first message transmission is successful only when the central controller recognizes the password of the authorized operator; this means, among other things, that the operator has not been captured. After the central controller has recognized the password, the reporting device receives permission from it to create an encryption key set. The operator may speak the password again into the device and, via keys or switches of the device requests the creation of an encryption key set. The secret key of the key set remains in the reporting device, while the public key is transmitted to the central controller. From this point on, the reporting device can send both digitalized text messages as well as digitalized voice messages encrypted via its public key to the central controller, and the reporting device can receive public-key encrypted messages from the central controller and via its secret key can decrypt them. To increase confusion to the enemy, transmissions between the central controller and a particular reporting device contain recognizable voice characteristics in variable positions within the message. The same is valid for transmissions of a reporting device to the central controller.

The transmission connection or channel between the central controller and a particular reporting device is based on a message-encryption key set; the central controller has the secret key and the reporting device the public key. Messages to the central controller are encrypted by means of the public key, transmitted, and received and decrypted by the central controller by means of a secret key. To increase the security even more, the central controller can generate, at any time and at variable intervals, a new message-encryption key set, and sends the public key to a particular reporting device.

The structure of the central controller and the mobile reporting device is illustrated in FIG. 1. The central controller 1 consists of a powerful minicomputer such as a signal processor of the type found currently within integrated information and fire control centers of many armies. In addition, a speech processing unit, consisting either of a fast Fourier transform processor or of a set of programs within the minicomputer capable of performing the analysis of the voice characteristics must be available within the central controller 1. Finally, there exists an interface with the operator in the form of a microphone and an audio processing unit 3 to digitize the voice signals in a form which can be used by the signal processor.

The mobile reporting device 2 is of similar form and construction of those currently used by many armies for forward observation purposes; such units may even include encryption circuits. The device of the current invention differs from those devices only in the manner in which the voice is handled. Voice is not only digitized and preprocessed by the audio unit 3 with its microphone input device, it is further preprocessed by the microcomputer of the reporting device 2. While the authorization of the operator is being established within the central controller location, the connection between the central controller and each of a plurality of mobile reporting devices may be via wire, a fiber optic connection, or via the radio connection from the reporting device to its communication partners; this interface is not shown in the figure, but is identical to those mobile reporting devices currently in use. Within the units labeled 1 and 2, the memory sizes are shown to indicate the requirements for the various processing tasks within the central controller and the reporting device.

Figure 2:
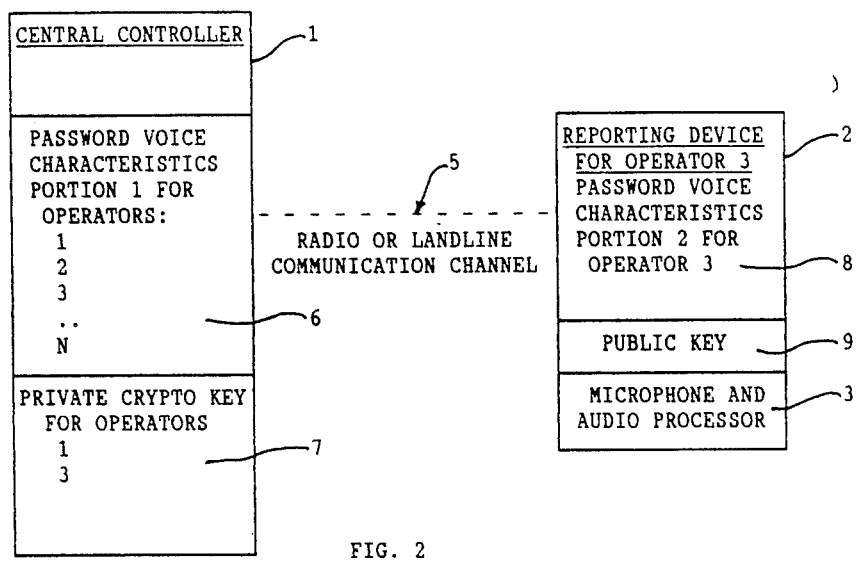
FIG. 2 is a block diagram illustrating the setup of the central controller and the reporting device after the beginning of the transmission but before the final two-way encrypted data transmission of the present invention may begin.

FIG. 2 illustrates the status of the central controller and one of its reporting devices 2. Obviously, a plurality of reporting devices may be simultaneously active, as illustrated by the list of possible active devices 6, and the list 7 of those actually active and whose operators are still recognized as authorized as well as being noncaptive. Element 6 of FIG. 2 shows the current operators, but not all of those may at the current time be authorized to operate their devices as authorized operators; indicated only is that their password recognition data is stored and current. The reporting device 2 of this example is currently being used by operator 3, as shown in the illustration box 8; also indicated therein is that the password voice characteristics, i.e. the recognition data for this operator, are stored within his device 2.

Via algorithms and/or advanced integrated circuits, the voice is analyzed in order to compare the characteristics with those stored within the device 2. Only when there is significant agreement between the stored characteristics and those input as a password by the operator, would the channel 5 be opened for communication with the central controller. For this purpose, the initial contact of device 2 from the remote station with central controller 1 makes use of the initial public key 9. Thus, only the central controller can interpret the initial transmission from this device 2.

Figure 3:
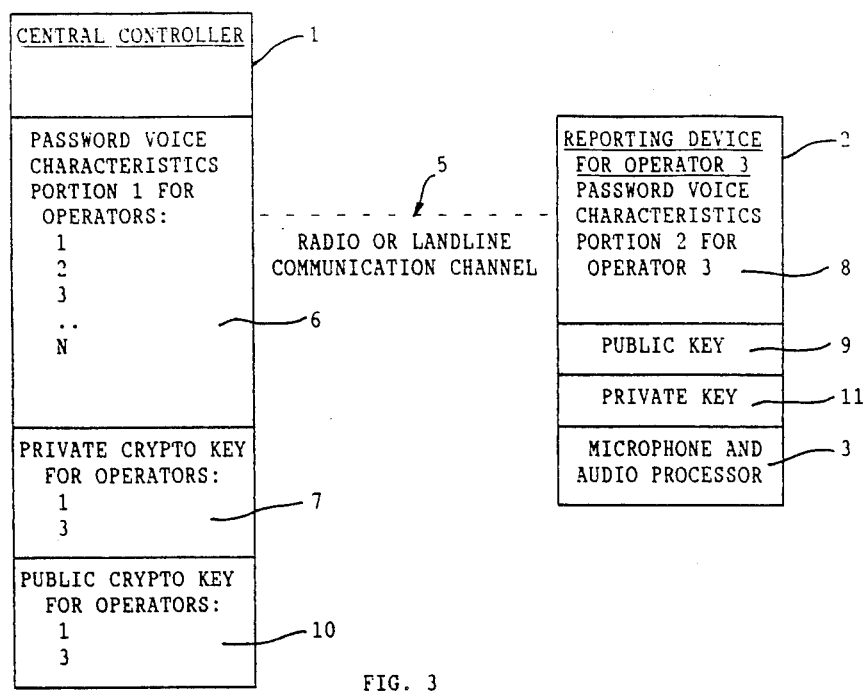
FIG. 3 illustrates the setup of the central controller and the reporting device in a remote location after the central controller has recognized the operator as authorized and that the operator is a noncaptive.

FIG. 3 illustrates the central controller 1 in contact with reporting device 2 in two-way encrypted communications via channel 5. As in FIG. 2, the operator of reporting device 2 of the example has the designation 3, as shown in the illustration box 8. In the illustration box 11 of reporting device 2, it is also shown that an encryption keyset has been created, and that the device 2 has retained its private key. Shown in the illustration box 10 for the central controller 1 is the indication that two operators have full two-way communications with the central controller, one of these being the operator 3 of the reporting device 2 of this example.

Figure 4:
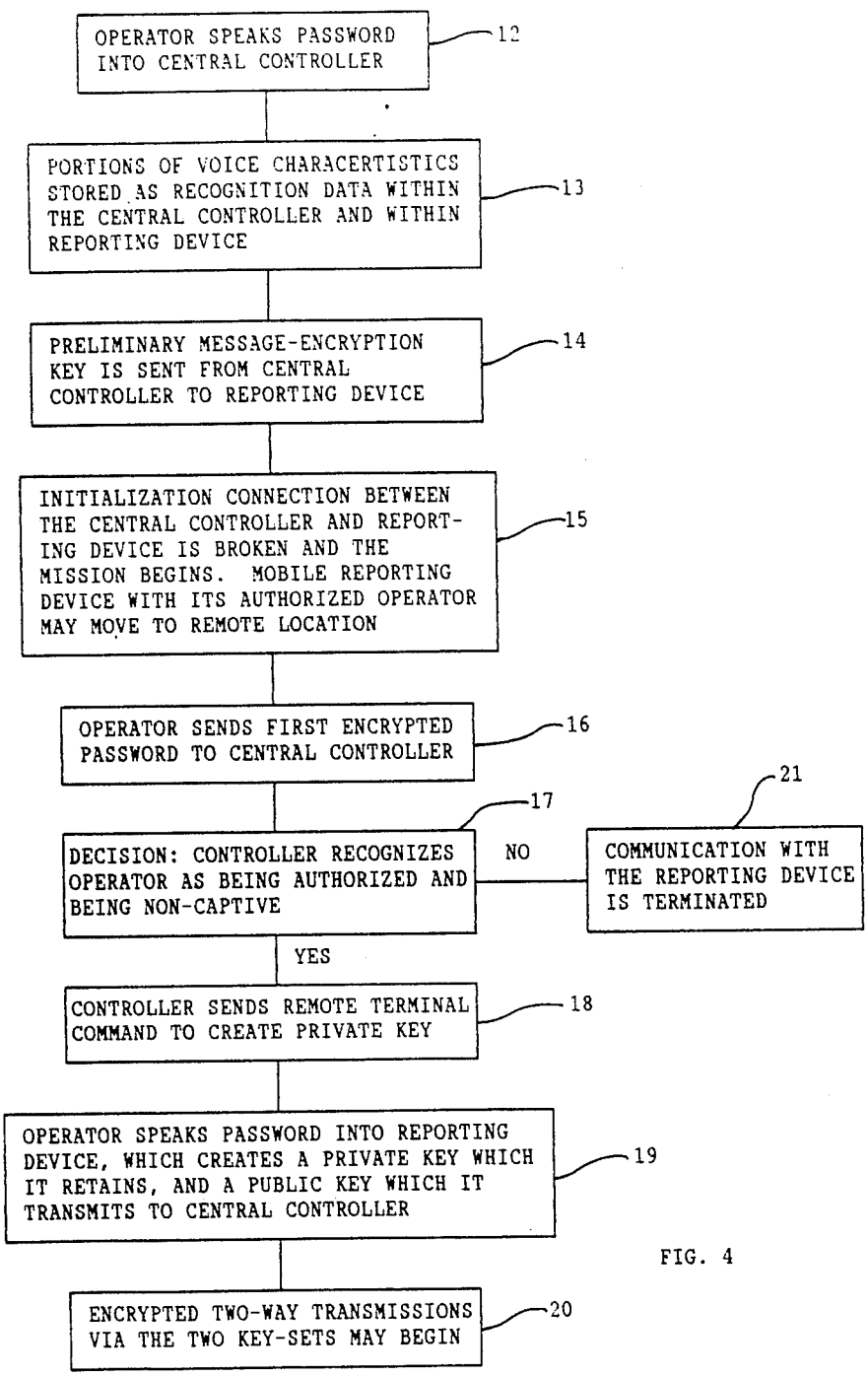
FIG. 4 is a diagram of the logical steps which occur during the initialization of the reporting device of the present invention as illustrated in FIGS. 1-3.

FIG. 4 is a logical diagram of the steps leading up to the opening of the secure channel 5 of FIG. 3, which is represented by the logical box 20. Illustration boxes 12 through 14 represent the steps described in the description of FIG. 1, boxes 16 through 19 illustrate the steps leading up to the status described for FIG. 2, and box 20 illustrates the end result of the successful opening of the secure communications channel 5 of FIG. 3. Box 21 is the logical consequence of the failure of the central controller to positively identify the operator 3 of the example of FIGS. 1 and 2 as being authorized and being a noncaptive.

What is claimed is:

1. A method for encrypted information transmission, especially on the battlefield, between a normally mobile or handheld reporting device and a central controller, whereby the information encryption as well as the transmission is dependent on the voice characteristics of a spoken password, comprising the steps of:

analyzing the voice characteristics of a known operator of said reporting device speaking a password in a relaxed manner;

storing the results of said analyzing step in onboard memories of both said central controller and said reporting device;

speaking the password into the reporting device by the known operator;

performing a first voice analysis of said password spoken by said operator using said reporting device;

comparing said voice analysis results to the voice characteristics of said operator stored in said reporting device;

opening a transmission channel between said reporting device and said central controller if said comparison indicates a correspondence between the voice characteristics of said stored and said later operator spoken password;

transmitting said voice analysis to said central controller and performing a second voice analysis at said central controller by comparing said analyzed voice results to said stored voice analysis results; and opening an information transmission channel between said central controller and said reporting device if the results of said voice analysis comparison indicates agreement between said stored analysis and said later analysis by said central controller.

2. The method of claim 1, wherein, after the release of the information transmission channel by the reporting device based upon voice characteristics of the operator, a one-way channel to the central controller is opened.

3. The method of claim 2, whereby a part of the password analysis results is stored in the reporting device and another part of the password analysis results of the same password is stored in the central controller.

4. The method of claim 2, whereby after the learning process and storage of the voice characteristics, a preliminary message-encryption key is transferred to the reporting device form the central controller.

5. The method of claim 1, whereby a part of the password analysis results is stored in the reporting device and another part of the password analysis results of the same password is stored in the central controller.

6. The method of claim 5, whereby after the learning process and storage of the voice characteristics, a preliminary message-encryption key is transferred to the reporting device form the central controller.

7. The method of claim 5, whereby after the learning process and storage of the voice characteristics, a preliminary message-encryption key is transferred to the reporting device form the central controller.

8. The method of claim 5, whereby after the creation of a message-encryption key set, the reporting device retains a secret key and transfers a public key to the central controller.

9. The method of claim 1, whereby after the learning process and storage of the voice characteristics, a preliminary message-encryption key is transferred to the reporting device form the central controller.

10. The method of claim 9, whereby after the creation of a message-encryption key set, the reporting device retains a secret key and transfers a public key to the central controller.

11. The method of claim 1, whereby after the creation of a message-encryption key set, the reporting device retains a secret key and transfers a public key to the central controller.

* * * * *